United States Patent [19]
Billinger et al.

[11] Patent Number: 4,799,255
[45] Date of Patent: Jan. 17, 1989

[54] COMMUNICATION FACILITIES ACCESS CONTROL ARRANGEMENT

[75] Inventors: Randy J. Billinger, Thornton; Laurel K. Dotter, Boulder; Tommy D. Gasaway, Westminster, all of Colo.

[73] Assignee: American Telephone and Telegraph Company - AT&T Information Systems, Holmdel, N.J.

[21] Appl. No.: 9,175

[22] Filed: Jan. 30, 1987

[51] Int. Cl.⁴ ............................................. H04M 3/00
[52] U.S. Cl. .................................. 379/189; 379/244; 379/112
[58] Field of Search ............... 379/189, 196, 197, 198, 379/243, 244, 112, 121

[56] References Cited
U.S. PATENT DOCUMENTS

| | | | |
|---|---|---|---|
| 3,867,582 | 2/1975 | Weed et al. | 379/198 |
| 4,371,752 | 2/1983 | Matthews | 379/196 X |
| 4,447,676 | 5/1984 | Harris et al. | 179/90 BD |
| 4,486,626 | 12/1984 | Kohler | 379/196 |
| 4,625,081 | 11/1986 | Lotito et al. | 379/196 X |

*Primary Examiner*—James L. Dwyer
*Attorney, Agent, or Firm*—John C. Moran; James M. Graziano

[57] ABSTRACT

The communication facilities access control arrangement of the telephone communication system detects the dialing of an unauthorized or invalid long distance transmission facility access code and identifies the calling station. A record is maintained of all invalid attempts to access the long distance facilities. When the number of invalid attempts by a calling station exceeds a predetermined limit, the telephone communication system restricts the calling station from all further long distance transmission facility access and generates an alarm indication to identify a possible facility access problem.

5 Claims, 7 Drawing Sheets

FIG. 2

CALL PROGRESS TABLE

| IDENTIFICATION OF ASSIGNED OUTGOING TRUNK | IDENTIFICATION OF CALLING STATION (ANI) | IDENTIFICATION OF CALLED STATION | ACCOUNT CODE LENGTH | FACILITY RESTRICTION LEVEL | DURATION OF CONNECTION | AUTHOR-IZATION CODE | ACCOUNT CODE |
|---|---|---|---|---|---|---|---|
| 107 | 303 538 1010 | 416 273 8424 | 5 | 0 | 402 | 1471 | 4210 |
| 108 | 303 538 0122 | 212 557 1910 | 5 | 3 | 22 | 3871 | 1039 |
| 109 | 303 538 1111 | 201 222 1788 | 5 | 5 | 171 | 4553 | 9292 |
| ... | ... | ... | ... | ... | ... | ... | ... |
| 110 | 303 538 1002 | 212 157 1111 | 5 | 2 | 43 | 6777 | 7645 |

ANI VERIFICATION TABLE

| CALLING STATION ANI | INTER-EXCHANGE CARRIER ACCESS STATUS | ACCOUNT CODE LENGTH | FACILITY RESTRICTION LEVEL |
|---|---|---|---|
| 303 538 1010 | 1 | 5 | 1 |
| 303 538 0122 | 2 | 5 | 0 |
| 303 538 1111 | 2 | 5 | 1 |
| ... | ... | ... | ... |
| 303 538 1002 | 3 | 5 | 0 |

1 = VALID ANI
2 = REQUIRES AUTHORIZATION CODE
3 = RESTRICT CALL CONNECTION

AUTHORIZATION CODE TABLE

| DEFINED STATUS | CALLING STATION AUTHORIZATION CODE | ACCOUNT CODE LENGTH | FACILITY RESTRICTION LEVEL |
|---|---|---|---|
| 1 | 1471 | 5 | 1 |
| 2 | 1492 | 5 | 0 |
| 1 | 3871 | 5 | 1 |
| 1 | 4553 | 5 | 3 |
| 1 | 6777 | 5 | 6 |
| ... | ... | ... | ... |
| 2 | 9218 | 5 | 0 |

1 = VALID
2 = INVALID

SECURITY DATA BASE TABLE

| ANI NUMBER | PREVIOUS NUMBER OF INVALID ATTEMPTS | DATE OF PREVIOUS INVALID ATTEMPTS |
|---|---|---|
| 303 538 0101 | 10 | 11/14/86 |
| 303 538 0111 | 8 | 10/5/86 |
| 303 538 0122 | 4 | 11/15/86 |
| 303 538 1111 | 6 | 2/1/86 |
| ... | ... | ... |
| 303 538 2999 | 3 | 6/22/86 |

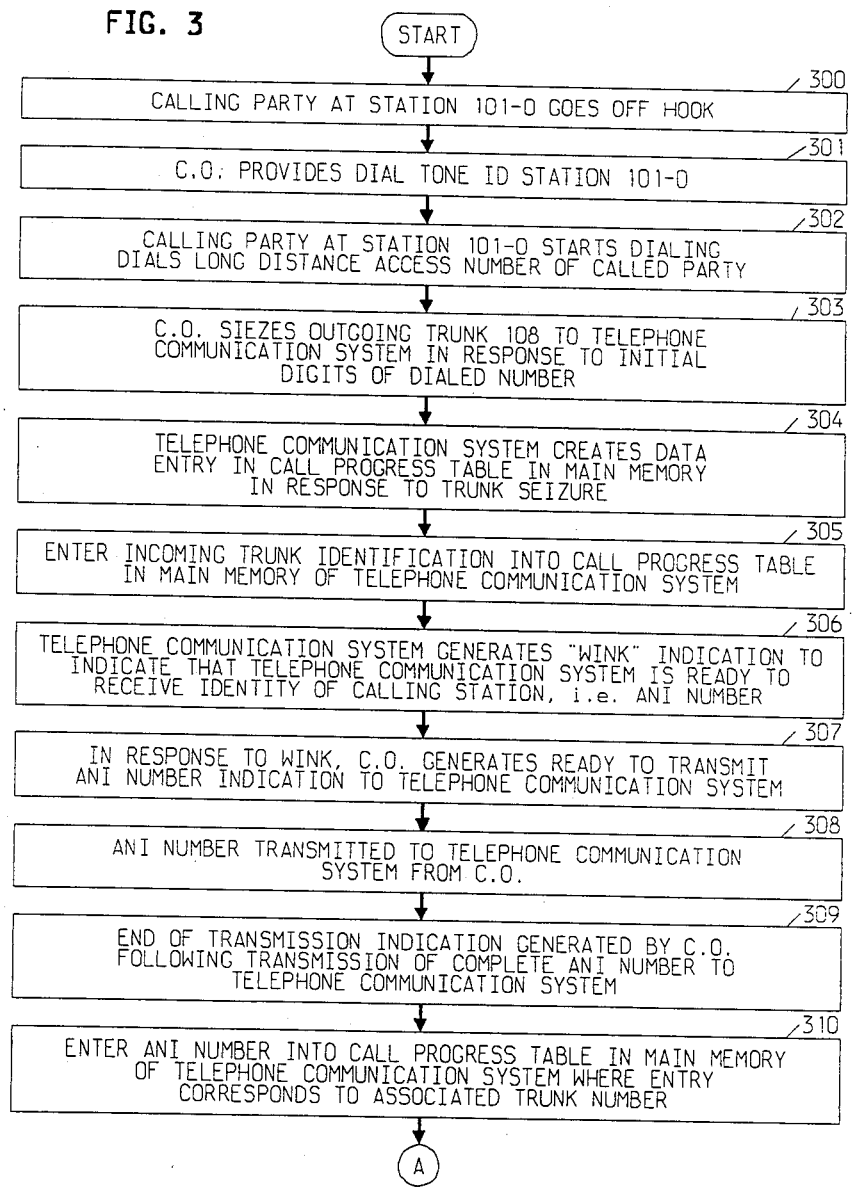

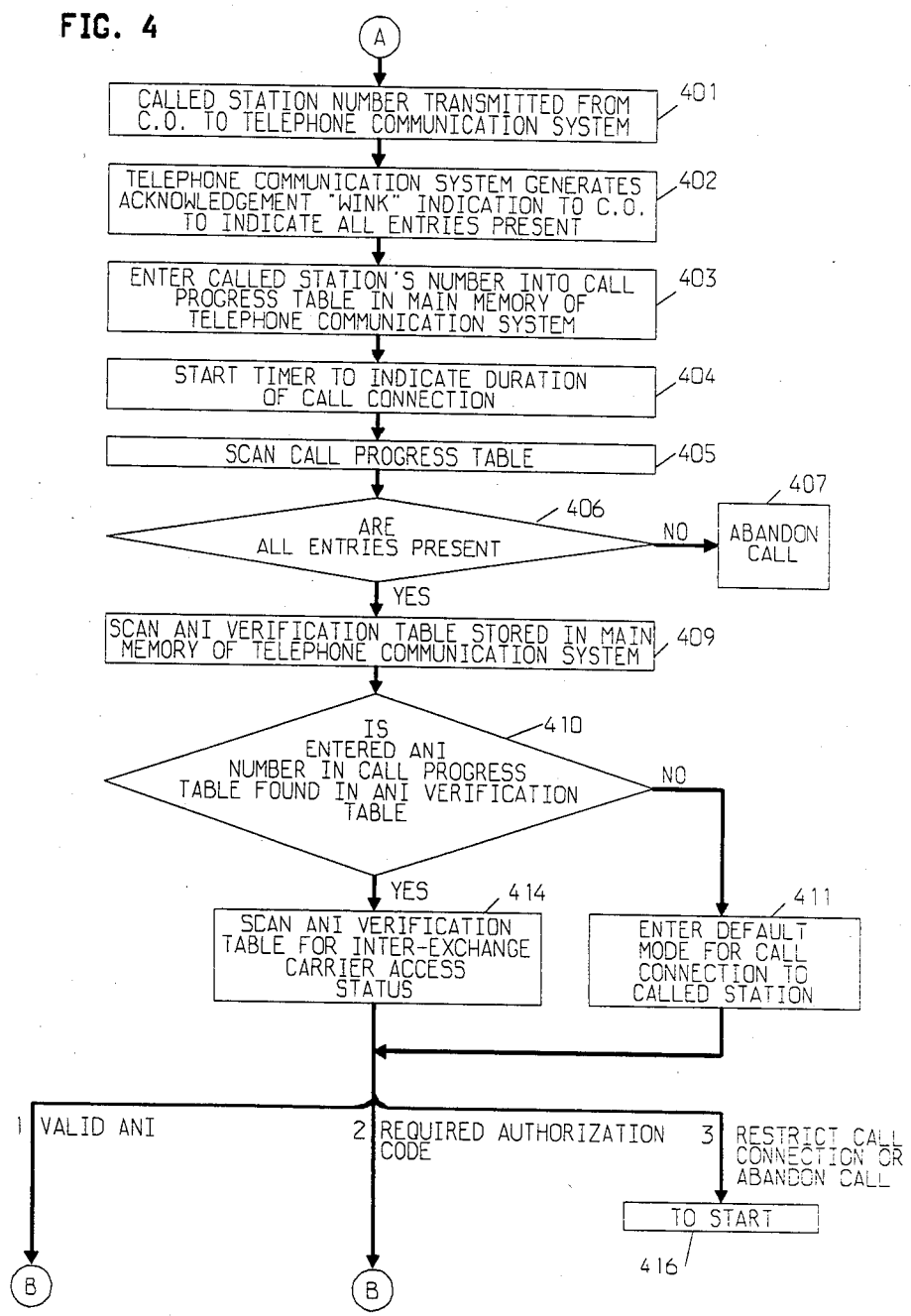

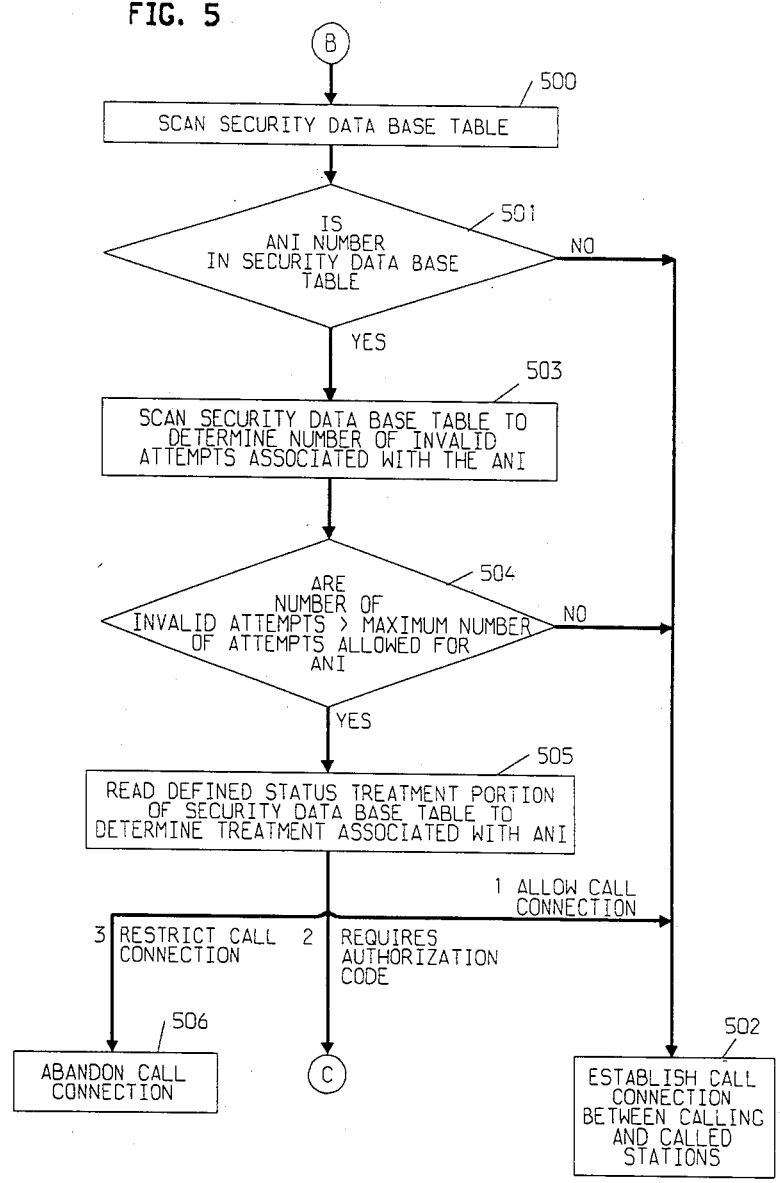

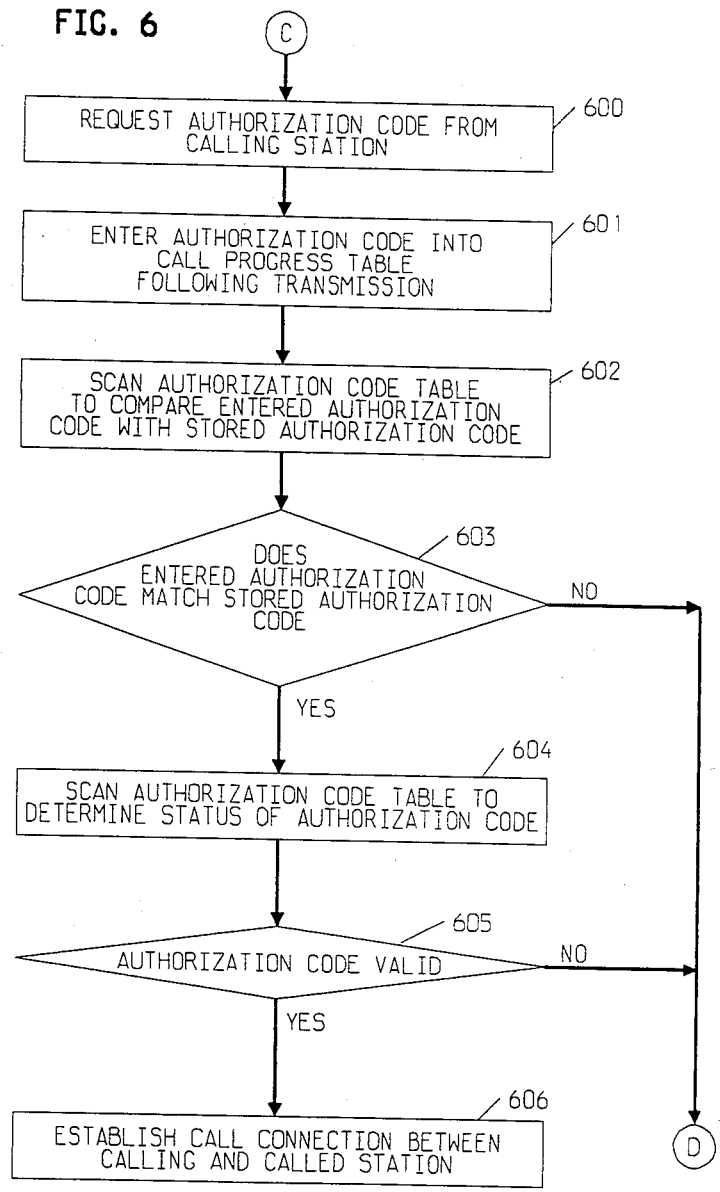

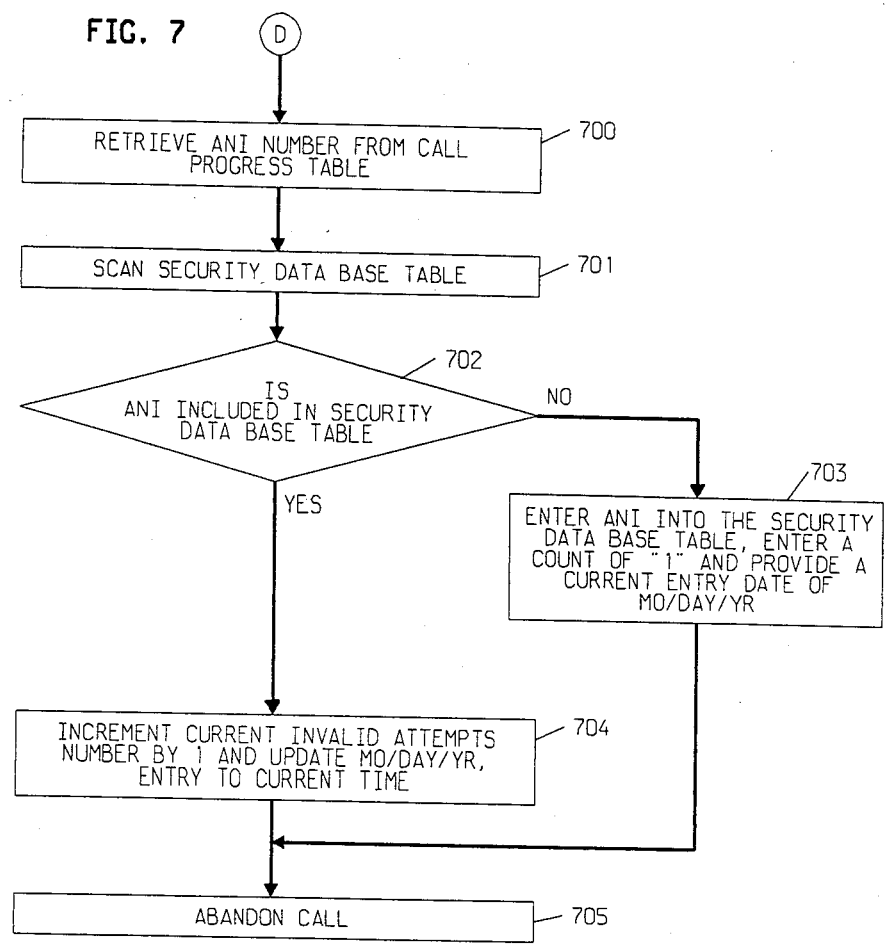

COMMUNICATION FACILITIES ACCESS CONTROL ARRANGEMENT

CROSS-REFERENCE TO RELATED APPLICATION

The following U.S. applications, which are assigned to the same assignee as the instant application and filed concurrently therewith, has related subject matter:

(1) R. J. Billinger, et al., "Inter-Exchange Carrier Access", Ser. No. 009,178; and (2) F. J. Bogart, et al., "Inter-Exchange Carrier Access Selection Feature for a PBX User", Ser. No. 009,174.

FIELD OF THE INVENTION

This invention relates to telephone communication systems and, in particular, to a control arrangement to regulate access to long distance transmission facilities.

PROBLEM

It is a problem in a telephone communication systems to control access to long distance transmission facilities. These long distance transmission facilities can include inter-exchange carrier facilities, tie lines, WATS lines, private carrier facilities, etc. A subscriber on a telephone communication system is generally required to dial a predefined long distance transmission facility access code to place a call via one of the available long distance transmission facilities. A difficulty with this arrangement is that a subscriber can repetitively dial different access code combinations to determine, by trial and error, the appropriate long distance transmission facility access code. This method of determining the predefined access codes is simplified by the availability of a computer facility which can be programmed to automatically test various access code combinations.

SOLUTION

This problem is solved and a technical advance achieved by the subject communication facilities access control arrangement that monitors the use of long distance transmission facility access codes to detect unauthorized facility access requests. The communication facilities access control arrangement of the telephone communication system identifies the calling station in response to the dialing of an unauthorized or invalid long distance transmission facility access code. A record is maintained of all invalid attempts to access the long distance facilities. When the number of recorded invalid attempts by a calling station exceeds a predetermined limit, the telephone communication system restricts the calling station from all further long distance transmission facility access and generates an alarm indication to identify a possible facility access problem.

BRIEF DESCRIPTION OF THE DRAWING

These and other advantages of the invention may be better understood from a reading of the following description of one possible exemplary embodiment taken in conjunction with the drawing in which:

FIG. 2 illustrates the logical memory structure of the switch processor of the telephone communication system; and FIGS. 3–7 illustrate a flow chart which defines the call processing steps to implement the authorization code protection feature.

DETAILED DESCRIPTION

Figure 1:
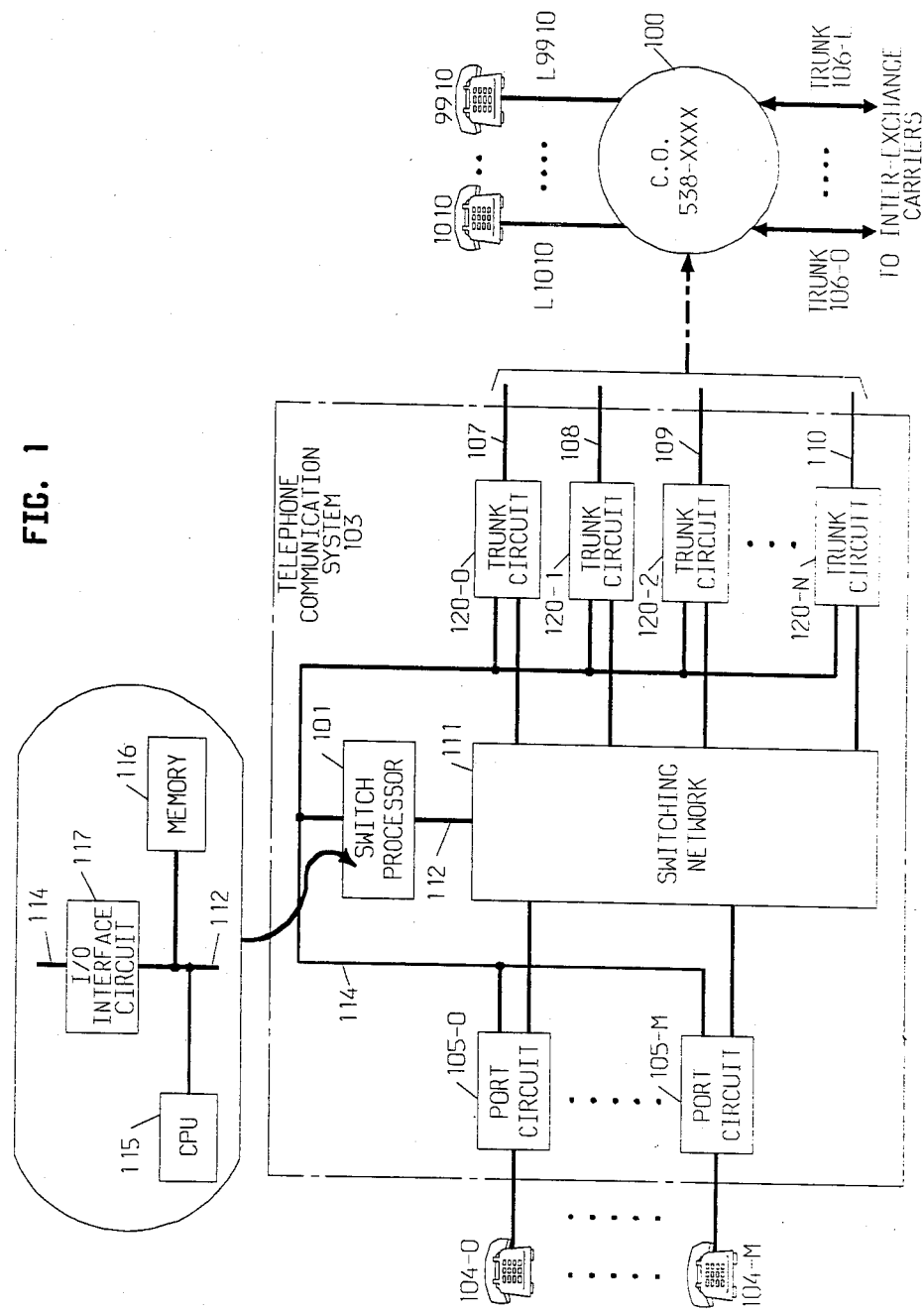
FIG. 1 illustrates a simplified block diagram of a telephone communication system.

FIG. 1 illustrates a telephone communication system 103 in block diagram form. FIG. 1 also illustrates central switching office (C.0.) 100 which serves stations 1010 through 9910 over central office lines L1010 through L9910. Central switching office 100 is designated by an area code (303) and an exchange code (538xxxx). Additionally, central switching office 100 connects via trunks 106-0 to 106-L to one or more inter-exchange carriers (not shown). Central switching office 100 also connects over trunks 107–110 to telephone communication system 103.

Telephone communication system 103 is a conventional program controlled PBX such as is known to the art. FIG. 1 illustrates a plurality of terminal equipment 104-0 to 104-M each of which is associated with a respective one of telephone communication system port circuits 105-0 to 105-M. This terminal equipment includes telephone station sets as well as digital terminal devices. Telephone communication system 103 is also equipped with a plurality of trunk circuits 107–110 which interconnect telephone communication system 103 with local central switching office 100. Telephone communication system 103 includes a switching network 111, connected to port circuits 105-0 to 105-M and to trunk circuits 120-0 to 120-N. Switch processor 101 consists of a central processing unit 115, which is a general purpose processor, and its associated memory 116 switch processor 101 also includes a data input/output interface circuit 117 which is connected to all of the port circuits 105-0 to 105-M and trunk circuits 120-0 to 120-N by bus 114. Input/output interface circuit 117 and bus 114 function to carry control signals between switch processor central processing unit 115 and both port circuits (105-0 to 105-M) and trunk circuits 120-0 to 120-N. Switching network 111 functions under the control of switch processor 101 to establish communication connections among the communication devices comprising the terminal equipment and trunks by interconnecting the associated port circuits and trunk circuits.

Telephone communication system 103 can be directly connected to inter-exchange carrier trunks, tie lines, etc. (not shown) and is also connected to central switching office 100 in order to obtain access to inter-exchange and intra-exchange carriers. In order to access inter-exchange carriers via the central switching office 100, telephone communication system 103 must provide an inter-exchange carrier access code to central switching office 100 which provides access to the inter-exchange carrier indicated by the calling party. In particular, a calling party on a call origination must first dial an inter-exchange carrier access code in order to access the appropriate inter-exchange carrier via central switching office 100. The inter-exchange carrier then requests the user's personal identification code and the called number in order to establish a call connection through the inter-exchange carrier that will serve the call. The process of establishing a call connection via central switching office 100 through a specified inter-exchange carrier is subsequently discussed in more detail.

SWITCH PROCESSOR MEMORY STRUCTURE

FIG. 2 discloses in tabular representation the structure of memory 116 in telephone communication system 103 which stores data relevant to the authorization code security feature for telephone communication system 103. In particular, FIG. 2 comprises a call progress table, an ANI verification table, authorization code table and a security data base table. All the possible table entries are not shown in FIG. 2, only those entries are shown which are pertinent to the present disclosure.

The call progress table of FIG. 2 indicates the current status of a call connection as it exists between a calling station and a called station. The call progress table identifies: the calling station, the called station, the month, the length of time that the call connection remains established, an authorization code as dialed by the calling station, and the identity of the outgoing trunk serving this call connection.

The ANI verification table maintains a list of calling party (ANI) numbers. Each ANI number of the table is associated with a particular calling party inter-exchange carrier access status. The possible inter-exchange carrier access status conditions are: the ANI is valid and the calling party is not required to dial an authorization code, the ANI is valid and the calling party is required to dial an authorization code, the call connection is to be restricted.

The authorization code table provides a list of authorization codes and an indication of the validity or invalidity of each authorization code. In particular, a one stored in the authorization code table indicates that the associated authorization code is valid, while a two indicates an invalid authorization code.

The security data base table is that table which provides telephone communication system 103 with the capability to provide an authorization code security arrangement to detect unauthorized attempts by a calling party to gain access to a particular carrier through repeatedly dialing authorization codes. In particular, the security data base table comprises a list of calling party numbers. Each calling party number is associated with a number of invalid attempts, i.e., the number of times a particular station user has attempted to dial an authorization code and has failed to provide a valid authorization code. The date of the last invalid attempt is also maintained in the security data base table. The date includes the month, date and year that such an attempt was made.

CALL ORIGINATION

FIGS. 3 through 7 provide in flow chart form the steps required to implement the communications facilities access control arrangement. This access control arrangement can regulate access to communications facilities either from terminal equipment 104-0 to 104-M or from telephone station sets 1010 to 9910. For the purpose of this description, access by a subscriber at telephone station set 1010 is disclosed. At step 300 a calling party, such as a subscriber at telephone station set 1010, which is served by central switching office 100, goes offhook. In response to the offhook condition of telephone station set 1010, central switching office 100 provides dial tone to the subscriber at telephone station set 1010 via path L1O10 at step 301. In response to the received dial tone the calling party at telephone station set 1010 dials (step 302) an inter-exchange call. The subscriber can be presubscribed to an inter-exchange carrier, in which case the subscriber dials 1+ the called number. If the subscriber is not presubscribed or wishes to override the presubscription choice, the subscriber dials 1+ inter-exchange carrier access code + the called number. Assume that the subscriber selects the inter-exchange carrier by dialing an inter-exchange access code which identifies the facilities reseller telephone communication system 103. Central switching office 100 at step 303 responds to the calling party's dialing of this inter-exchange call by seizing one of trunks 107 to 110 to connect the calling party with the facility reseller telephone communication system 103.

Assume for the purpose of this description that central switching office 100 seizes trunk 107. A seizure of trunk 107 by central switching office 100 is detected by trunk circuit 120-0 in telephone communication system 103. The incoming call connection from central switching office 100 to telephone communication system 103 via trunk 107 is detected by central processing unit 115 as part of the periodic scans of port circuits 105-0 to 105-M and trunk circuits 120-0 to 120-N by central processing unit 115. At step 304, central processing unit 115 creates an entry in the call progress table stored in memory 116. This entry indicates the identification of the trunk (107) serving this incoming call. At step 306, central processing unit 115 transmits control signals via input/output interface circuit 117 and bus 114 to trunk circuit 120-0 to indicate that telephone communication system 103 is ready to receive the calling party information. These control signals cause trunk circuit 120-0 to transmit a wink signal to central switching office 100 over trunk 107 to indicate that telephone communication system 103 is ready to receive the calling party information. At step 307, central switching office 100 responds to the wink signal by transmitting over trunk 107 a ready to transmit ANI number indication to trunk circuit 120-0. At step 308, central switching office 100 transmits the calling party identification, which consists of the ANI number (5381010), to telephone communication system 103. At step 309, central switching office 100 transmits an end of transmission indication to alert telephone communication system 103 that the complete calling party identification (the ANI number) has been transmitted to telephone communication system 103. At step 310, central processing unit 115 stores the received ANI number (5381010) as obtained from trunk circuit 120-0 via input/output interface circuit 117 and bus 114, into the call progress table of memory 116. The identification of calling station (ANI) entry associated with incoming trunk 107 now contains the identification of the calling party.

At step 302, the calling party at telephone station set 1010 dialed the number of the called party (ex 416-2738424). The digits dialed by the calling party are transmitted by central switching office 100 over trunk 107 to telephone communication system 103 where these dialed digits are received in well-known fashion at step 401. At step 402, where central processing unit 115 signals trunk circuit 120-0 via input/output interface circuit 117 and bus 114 to transmit a 'wink' acknowledgement signal to central switching office 100 over trunk 107 to indicate that all the entries have been received by telephone communication system 103. Central switching office 100 responds to the wink signal with an end of transmission signal. At step 403, central processing unit 115 enters the dialed digits in the call progress table of memory 116. In addition to the number of the called station, central processing unit 115 at step 403 adds a time stamp in the call progress table to indicate the month, day and year that the call is placed to the called party by the calling station. In addition, a timer is started at step 404 to indicate the duration of this call connection between the calling and the called parties for billing purposes. At step 405, central processing unit 115 scans the call progress table in memory 116 to determine whether all the required data entries are present for this call. If the calling or called station identification is missing or if a call restriction signal is included in the received ANI number, central processing unit 115 proceeds to step 407 and abandons this call connection. Assume for the purpose of this description that all the required data entries are present in the call progress table in memory 116.

ANI VERIFICATION TABLE

At step 409, central processing unit 115 scans the ANI verification table in memory 116 to determine whether the calling party has the proper authorization to originate a call to the called party. At step 410, central processing unit 115 determines whether the calling party number is listed in the ANI verification table. If the calling party number is not found in the ANI verification table, central processing unit 115 proceeds to step 411 and enters a default mode for the call connection to the called party. Central processing unit 115 assigns one of three possible inter-exchange carrier access status digits described below, along with a facility restriction level and an account code length descriptor. Call processing then proceeds to the junction of the three branches shown below step 414 in FIG. 4. If however the calling party ANI number is found in the ANI verification table, central processing unit 115 proceeds to step 414 to determine from the ANI verification table the inter-exchange carrier access status stored for the calling party.

There are three choices listed in the ANI verification table for inter-exchange carrier access status for the calling party. A 1 entry in the ANI verification table indicates that the calling station ANI is a valid number to be served by telephone communication system 103 without requiring an authorization code. A 2 entered in the ANI verification table indicates that an authorization code is required from the calling party before a call is placed to the called party. A 3 entered into the ANI verification table indicates that this call connection should be restricted because the calling party is not authorized to place any toll calls through telephone communication system 103. If a 3 has been found by central processing unit 115 in the ANI verification table in the defined status entry associated with the calling party ANI, the call connection is restricted and appropriate reorder tone signal or recorded announcement is provided to the calling party at step 416.

SECURITY DATA BASE TABLE

Assuming a valid ANI, central processing unit 115 scans the security data base table at step 500 to determine whether the calling party number is stored in the security data base table. At step 501 central processing unit 115 determines if the calling party number is in the security data base table. If the calling party number is not in the security data base table, this indicates that there have been no previous invalid attempts by the calling party to access a particular carrier.

CALL CONNECTION

Central processing unit 115 advances to step 502 and establishes a call connection between the calling and called stations. This is accomplished in well-known fashion by telephone communication system 103 seizing an idle outgoing trunk (ex 110) to central switching office 100. In response to dial tone from central switching office 100, telephone communication system outpulses an access code over trunk 110 to obtain access to one of trunks 106-0 to 106-L in central switching office 100 to an inter-exchange carrier. Alternatively, telephone communication system 103 may have direct access to inter-exchange access carrier trunks, in which case telephone communication system 103 simply seizes an idle inter-exchange carrier access trunk.

Once an inter-exchange carrier trunk is seized, telephone communication system 103 outpulses the called party number to the inter-exchange carrier and establishes a connection in switching network 111 between the trunk (107) serving the calling party (5381010) and this inter-exchange carrier trunk.

However, assume that at step 501 the calling party number is located in the security data base table. Central processing unit 115 at step 503 scans the security data base table to determine the number of invalid attempts associated with the calling party number, i.e., the number of times that this calling station attempted to dial an authorization code that turned out to be invalid. Central processing unit 115 advances to step 504 and determines whether the number of invalid attempts associated with the calling party number exceeds a set threshold number. If the number of invalid attempts does not exceed this threshold, central processing unit 115 advances to step 502 and establishes a call connection between the calling and called stations as described above. However, if at step 504 the number of invalid attempts exceeds the maximum number of attempts allowed for the calling party then call processing advances to step 505.

At step 505, central processing unit 115 reads the defined status treatment entry associated with the calling party number in the security data base table to determine how a valid call from this particular calling party number is processed when a predetermined number of invalid attempts have been recorded. Those treatment entries, as previously described, are labeled 1, 2 and 3 respectively. If this particular calling party number is assigned a 1 treatment at steps 411 or 414 and 505, the call connection is allowed and therefore call processing advances to step 502 and a call connection is established between the calling and the called stations as described above. If the calling party were assigned a 3 treatment at steps 411 or 414 or 505, the call is abandoned at step 506. The assignment of a 3 treatment indicates that the calling party at the calling station is assumed to be an unauthorized user and therefore a call will not be established between the calling and the called stations. Now assume that the calling party number is assigned a 2 treatment at steps 411 or 414 and 505. This is the case where the calling party is able to place a toll call if the calling party enters a correct authorization code. In this case, call processing advances to point C of FIG. 6.

AUTHORIZATION CODE

At step 600, central processing unit 115 requests an authorization code from the calling station. This is accomplished typically by connecting a recorded announcement unit (not shown) to the incoming call connection. The recorded announcement unit provides the calling party with instructions to enter the calling party's preassigned authorization code. The authorization code received from the calling station at step 601 is entered into the call progress table. In response to the receipt of the authorization code and the entering of the authorization code into the call progress table, central processing unit 115 scans the authorization code table at step 602 to compare the entered authorization code with the authorization code stored in memory 116 for the calling party number. At step 603 central processing unit 115 determines whether the authorization code entered into the call progress table matches one of the stored authorization code. If the authorization code received from the calling station matches one of the stored authorization codes in the authorization code table, central processing unit 115 proceeds to step 604 and scans the authorization code table to determine the status of this authorization code. If the status of this authorization code is determined to be valid at step 605, central processing unit 115 advances to step 606 and establishes a call connection as described above for step 502.

INVALID AUTHORIZATION CODE

Now assume that either the authorization code dialed by the calling party at step 603 did not match the stored authorization code or even if they did match it was determined at step 605 that the authorization code was not valid. Central processing unit 115 advances via point D of FIG. 7 to step 700 to deal with the mismatch or invalidity of the authorization code provided by the calling station.

At step 700, central processing unit 115 retrieves the calling party number from the call progress table. Central processing unit 115 at step 701 scans the security data base table to determine if the calling party number is included in the security data base. If the calling party number is not included in the security data base, central processing unit 115 at step 702 enters the calling party number in the security data base table and a count of 1 is associated with that particular calling party number since it is the first incident of an invalid attempt. Additionally, the month, date and year of this first invalid attempt is entered into the table to establish a first record with respect to a particular calling party number. Now assume that the calling party number already is included in the security data base table. This indicates that that particular calling party number has been associated with at least one previous invalid attempt to access an inter-exchange carrier. In response to the determination that that the calling party number is in the security data base table, central processing unit 115 advances to step 704 and increments the number of previous invalid attempts associated with that calling party number by one to indicate that another invalid attempt by that calling party number has occurred. Additionally, the month, day and year of the previous invalid attempt is updated to the present time to indicate when that particular calling party number was last associated with an invalid attempt to access an inter-exchange carrier. Central processing unit 115 proceeds to step 705 where the call is abandoned.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a telephone communication system, a method of detecting repetitive dialing of invalid authorization codes by a calling station in unauthorized attempts to access communication facilities comprising the steps of:
   identifying the telephone number of said calling station for a call;
   maintaining a permanent database of records based on telephone station numbers with each record comprising the number of calls made by an individual station that resulted in an unauthorized communication facility access attempt;
   detecting the dialing of an invalid authorization code by said calling station in an unauthorized communication facility access attempt;
   searching said database using the identified telephone number to determine if a record exists for said calling station;
   creating a record in said database for said calling station upon the determination that no record exists for said calling station;
   incrementing number of calls of said record for said calling station for the detected unauthorized communication facility access attempt;
   comparing said number of calls of said record for said calling station to predetermined criteria; and
   restricting all further access to said communication facility by said calling station for said present call and future calls when said number of calls of said record of said calling station satisfy said predetermined criteria.

2. The method of claim 1 wherein the step of restricting further comprises the steps of:
   prompting said calling station to provide authorization code data; and
   comparing said authorization code data provided by said calling party with authorization code data stored in a memory of said telephone communication system to validate the identity of said calling station.

3. The method of claim 1 wherein the step of comparing comprises the steps of:
   accessing the cummulative number of calls of said record for said calling station; and
   determining whether said cumulative number exceeds a predefined threshold as the predefined criteria.

4. In a telephone communication system which interconnects calling stations and communication facilities in response to the dialing of communication facility access codes by a calling station, apparatus for detecting the repetitive dialing of invalid authorization codes by a calling station in unauthorized communication facility access attempts comprising:
   means for maintaining a permanent database of records based on station telephone numbers with each record comprising the number of calls made by an individual station that resulted in an unauthorized communication facility access attempt;
   means responsive to the dialing of a communication facility access code by a calling station for identifying said calling station by telephone number;
   means responsive to said identifying means for transmitting an authorization code prompt to said calling party;
   means responsive to said calling party transmitting an authorization code for comparing said transmitted authorization code with a list of valid authorization codes;

means responsive to said comparing means failing to match said transmitted authorization code with any of said valid authorization codes, for searching said database using the identified telephone number to determine if a record exists for said calling station;

creating a record in said database for said calling station upon the determination that no record exists for said calling station;

means for incrementing number of calls of said record for said calling station;

means for comparing said number of said calls of said record for said calling station with a set of predetermined criteria; and means responsive to said records satisfying said predetermined criteria for restricting access to said communication facility by said calling station for said present call and future calls.

5. The apparatus of claim 4 wherein said means for comparing said number of calls includes:

means for accessing the cumulative number of calls of said record for said calling station; and means for determining whether said cumulative number exceeds a predefined threshold as the predetermined criteria.

* * * * *